United States Patent [19]

Rysavy

[11] Patent Number: 4,938,224

[45] Date of Patent: Jul. 3, 1990

[54] PROCESS FOR DETECTING ACCIDENTAL CONTACT WITH BODY FLUIDS

[76] Inventor: Joseph A. Rysavy, 3511 S. 105th Ave., Omaha, Nebr. 68124

[21] Appl. No.: 271,922

[22] Filed: Nov. 16, 1988

[51] Int. Cl.$^5$ .............................................. A51B 5/00
[52] U.S. Cl. ................................... 128/633; 250/459.1
[58] Field of Search ...................... 128/633, 653, 665; 600/897, 898; 604/403, 404, 416; 250/458.1, 459.1, 462.1, 483.1, 526

[56] References Cited

U.S. PATENT DOCUMENTS

| 3,422,265 | 1/1969 | Bolasny | 250/459.1 |
| 3,510,653 | 5/1970 | Render | 250/459.1 |
| 4,011,174 | 3/1977 | Molina | 250/459.1 |
| 4,170,823 | 10/1979 | Smyth et al. | 250/461.1 |
| 4,420,517 | 12/1983 | Ali | 604/403 |
| 4,526,869 | 7/1985 | Schwartz | 250/459.1 |
| 4,670,013 | 6/1987 | Bornes et al. | 604/403 |
| 4,827,944 | 5/1989 | Nugent | 604/404 |
| 4,863,454 | 9/1989 | LaBove | 604/416 |

FOREIGN PATENT DOCUMENTS

| 0155891 | 9/1985 | European Pat. Off. | 250/458.1 |
| 1068545 | 4/1986 | Japan | 250/458.1 |

*Primary Examiner*—Stephen C. Pellegrino
*Assistant Examiner*—Sharon Rose
*Attorney, Agent, or Firm*—John A. Beehner

[57] ABSTRACT

A process for detecting accidental contact body fluid samples includes the addition of a small amount of a fluorescent chemical to the body fluid sample, the fluorescent chemical serving as a marker detectable upon exposure to ultraviolet light, Accordingly, any spills of the body fluid sample on exposed surfaces can be readily visually detected upon illuminating those surfaces with an ultraviolet light. Likewise, a process for detecting accidental exposure to a body fluid by skin surface protected by gloves or another substantially fluid impervious covering comprises submerging the gloved or otherwise covered skin surface into a fluorescent fluid, removing the glove or other covering and then illuminating the skin surface with an ultraviolet light to visually detect any fluorescent spots caused by holes or other leaks through the glove or other covering.

16 Claims, 3 Drawing Sheets

PROCESS FOR DETECTING ACCIDENTAL CONTACT WITH BODY FLUIDS

BACKGROUND OF THE INVENTION

The present invention is directed generally to a process for detecting accidental contact with body fluids and more particularly to a process by which medical technicians and personnel may readily detemine whether their skin has accidentally contacted any potentially contaminated body fluids during the course of collecting and testing blood samples, performing surgry, dental hygiene, dentistry or the like.

Due to the increase concern for personal protection from contamination by potentially deadly medical samples such as hepatitis and AIDS, there is a need for a process which will afford a sense of security to individuals handling such samples by providing for the instantaneous detection of accidental contamination.

Nurses and lab technicians who collect and test blood samples do not ordinarily contact the blood, but rather only the collection apparatus, test tubes or other blood containing receptacles. Spills, accidental punctures and aeration from a centrifuge, for example, can however result in contact of the medical personnel's skin surface with the particular body fluids being handled. Whereas surgeons, dentists, and dental hygienists generally wear protective gloves, tiny pin holes or other tears in the gloves can result in exposure of the covered skin surface to the blood, saliva or other body fluids of a patient. A process for readily verifying that these personnel have not had direct skin contact with the body fluid which they handle will reduce any stress and anxiety caused by their work environment.

Fluorescent chemicals have been used for medical purposes such as in ophthalmology for detecting corneal scratches. In a non-analogous field, large water systems have been tested for leaks by placement of fluorescent chemicals into the water, which chemicals are detectable in amounts a little as two per parts per million. Such chemicals have also been used for tracing the flow of waste water.

A primary object of the invention is to provide an improved process for detecting accidental contact with body fluids.

Another object is to provide a process for treating body fluid samples which will enable detection of the body fluid samples after testing yet not have any significant effect on test results.

Another object is to provide a process for detecting any spills of body fluid samples.

Another object is to provide a process for verifying the cleansing of surfaces which have been contacted by treated body fluid samples.

Another object is to provide a process for readily assuring the wearer of protective gloves and the like that no accidental contamination has occurred through holes in the protective covering.

Another object is to provide such a process which is simple and inexpensive to perform and efficient in operation.

SUMMARY OF THE INVENTION

The process for detecting accidental contact with body fluid samples, according to the present invention, includes collecting or otherwise containing a body fluid sample in a receptacle such as a syringe, blood collecting needle, blood bag or test tube. A fluorescent chemical is provided in the receptacle either prior to or after introduction of the body fluids. After handling of the receptacle in the usual manner for collection and testing of the body fluid sample, any surfaces which may potentially have been exposed to contact with the body fluid sample can be illuminated with an ultraviolet light to detect any spills which will be visible as fluorescent spots due to the fluorescent chemical therein.

Similarly, medical personnel who wear protective gloves to guard against exposure to diseases carried by the blood or other body fluids, need assurance that the gloves or other protective covering has effectively protected them. This can be done by submerging the gloved hands or other covered skin surface into a bath containing a fluorescent chemical, withdrawing the hands, removing the gloves and then passing the hands or other skin surface under an ultraviolet light for detecting any leakage of the fluorescent fluid through the gloves or protective covering.

DESCRIPTION OF THE PREFERRED EMBODIMENTS

Figure 1:
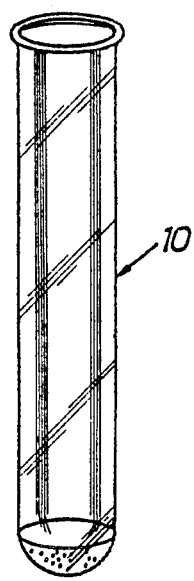
FIG. 1 illustrates a test tube containing a fluorescent chemical of the invention.
Figure 2:
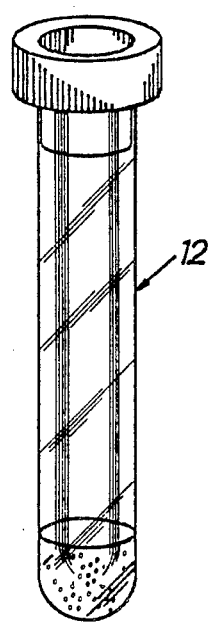
FIG. 2 shows an evacuated collection tube containing a fluorescent chemical of the invention.
Figure 3:
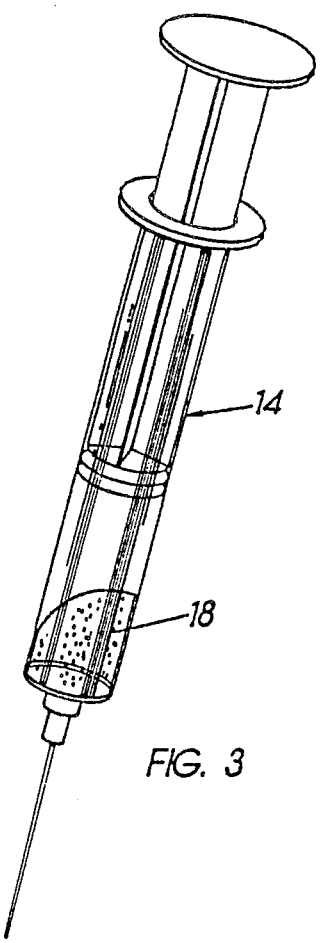
FIG. 3 shows a syringe including a fluorescent chemical of the invention.
Figure 4:
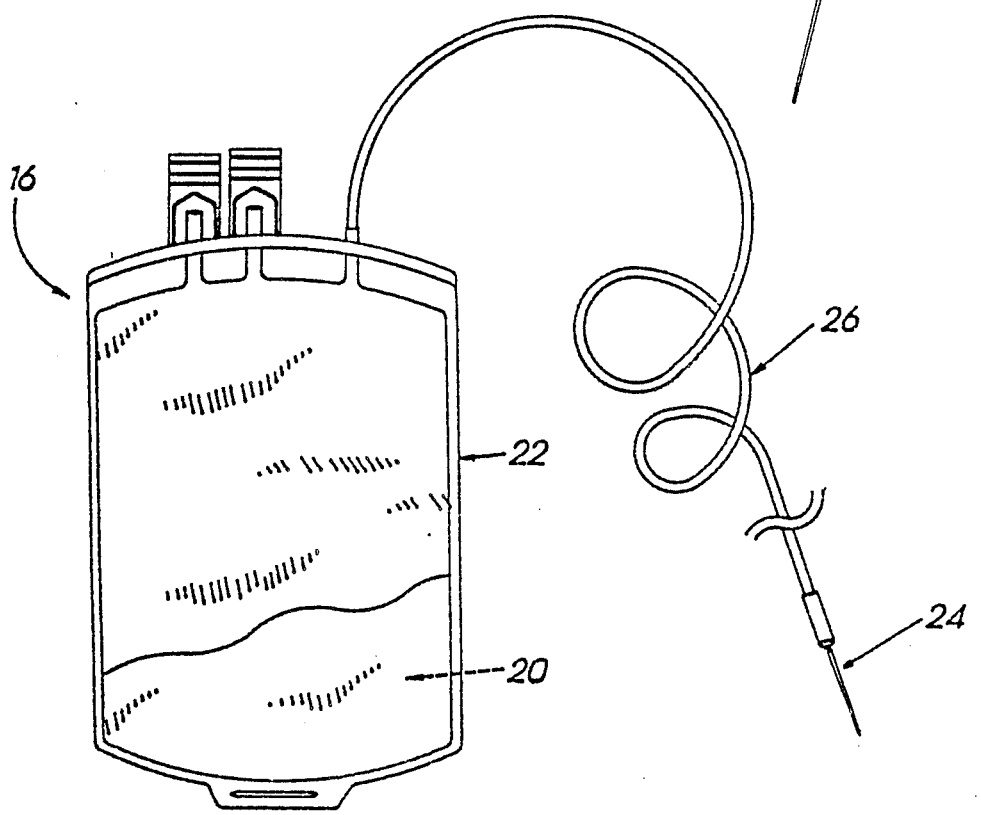
FIG. 4 shows a blood collection apparatus including a blood bag and containing a fluorescent chemical according to the invention.

The process for detecting accidental contact with body fluid samples, according to the present invention is described and illustrated in connection with such common medical paraphernalia as the test tube 10 of FIG. 1, the evacuated test tube 12 of FIG. 2, the syringe of FIG. 3, and the blood collection apparatus 16 of FIG. 4. Whereas this description is directed to test of blood samples, it is equally applicable to tests of other body fluids such as urine, saliva, semen, etc.

During handling and testing, blood may be splashed from a test tube 10 or 12 or otherwise dispersed such as by aeration from a centrifuge. Whereas contact of such fluid with the skin of a technician or other medial personel is not likely to be infectious, some potentially deadly diseases such as hepatitis and AIDS can possibly be contracted by exposure to infected body fluid samples. Also of concern are other viral diseases and bactrial diseases carried by the blood as well as rabies and/or other blood born diseases. Since some of these diseases can be transmitted through body fluids other than blood alone, it is important that those handling body fluid samples have a way to detect accidental contact with any such fluids.

A solution according to the present invention is to add to each sample a small amount of a fluorescent chemical to act as a marker which is detectable upon exposure to ultraviolet light. Thus, each person handling the sample can pass their hands, face, clothing, and the like under any ultraviolet light source to ascertain whether or not they have accidentally contaminated themselves or their work environment.

The fluorescent chemical may be added to any of the apparatus illustrated in FIGS. 1-4 in either a liquid form or in a dry desiccated state as indicated at 18 on the wall of syringe 14. The blood collection tubes such as the evacuated tubes 12 generally already contain a liquid anticoagulant to which the fluorescent chemical of the present invention may be added. The fluorescent chemical may be mixed with the anticoagulant or other fluids in the test tube prior to introduction of the blood sample or the fluorescent chemical may be inserted after the blood sample. Referring to the blood collection apparatus 16, the fluorescent chemical of the invention may be added in solution with the anticoagulant 20 in the blood bag 22 to which the collection needle 24 is connected by a flexible tubing 26.

Figure 5:
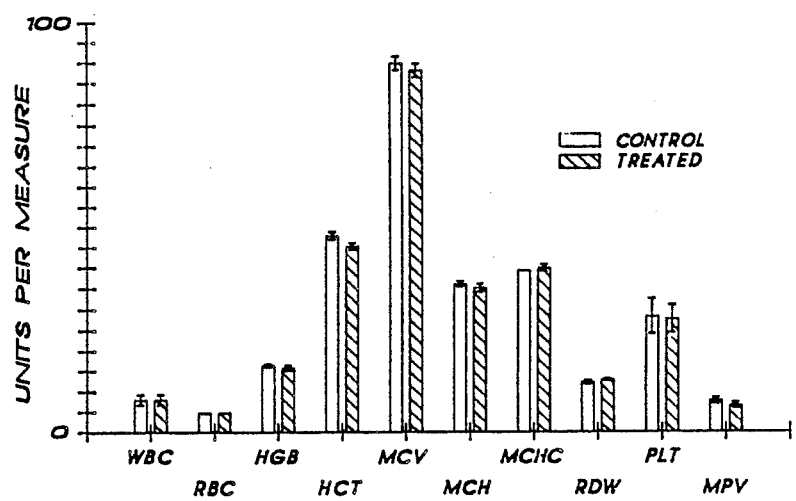
FIG. 5 is a graph comparing properties of blood samples, both untreated and treated according to the invention.

An initial concern about the use of the invention is the effect it may have on the testing of the body fluid samples. Whereas it could interfere with some tests and should not be used in those instances, it does not appear to affect the most common tests for blood samples, namely the SMAC 20 (Sequential Multiple Analizer with Computer) and CBC. To illustrate this point, FIG. 5 illustrates a comparison of test results on control blood samples including no fluorescent chemicals and treated samples including fluorescent chemicals, namely fluorescein. Those tests include the following:

WBC—whole blood count;
RBD—red blood count;
HGB—hemogloben;
HCT—hematocrit;
MCV—means corpuscular volume;
MCH—means corpuscular hemogloben;
MCHC—mean corpuscular hemogloben concentration;
RDW—red cell distribution width;
PLT—platelet; and
MPV—mean platelet volume.

The test results for both the treated and control samples are nearly identical and, in all cases, the ranges of standard deviation, indicated by the "I" at the top of each bar, overlap.

Figure 6:
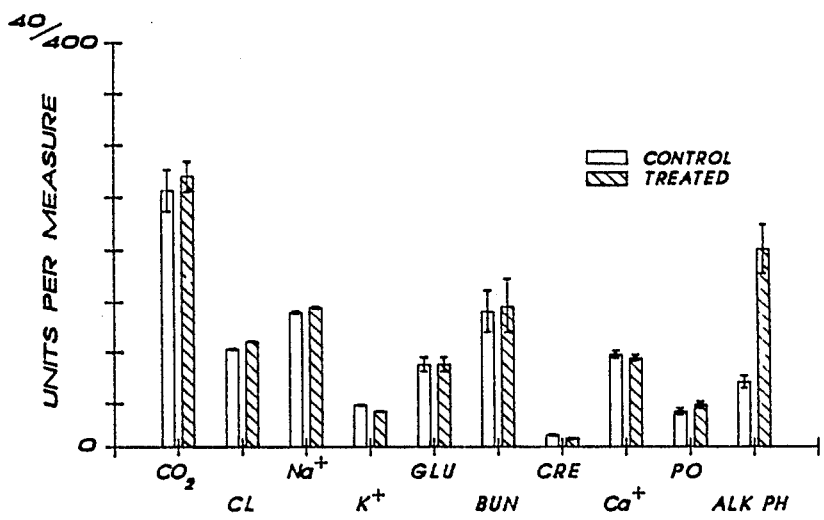
FIGS. 6 and 7 are graphs comparing levels of detectable elements in treated and untreated blood samples.
Figure 7:
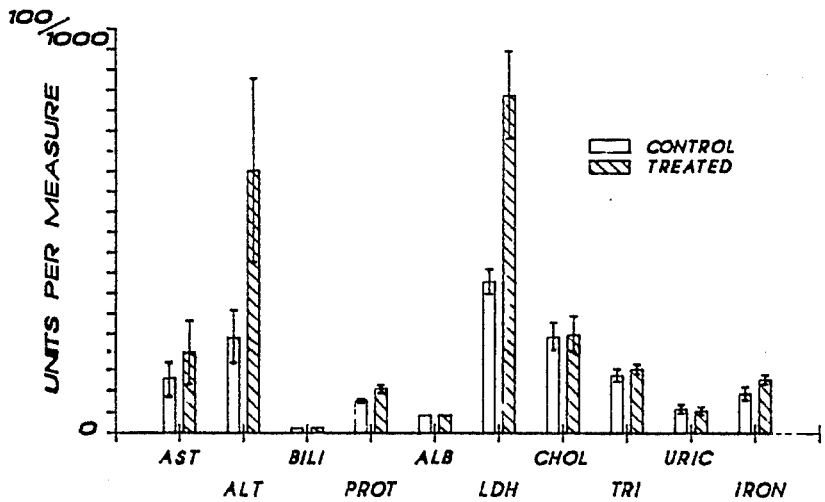

Likewise, most measurable elements within the blood samples were not affected by the addition of the fluorescent chemical as illustrated in FIGS. 6 and 7. The following elements were measured: CO—carbon dioxide; CL—chloride; Na—Sodium; K+—potassium; GLU—glucose; BUN; CRE—creatinine; Ca—clacium; PO—phosphorus; *ALK PH—ALK. THOS; and in FIG. 7 AST; *ALT; BILI, Total; PROT—Protein; ALB—albumen; *LDH; CHOL—cholesterol; TRI—trigly; Uric—uric acid; and IRON.

Only those elements preceded by an asterisk above showed any significant difference between the treated and control samples. Even those differences may be at least partially accounted for by the excessive amount of fluorescein added to the test samples to define the upper limits of possible interference.

Specifically, 4 milligrams of fluroescein were added per 5 millilter draw tube. The recommended amount of fluorescein or other fluorescent chemical for the invention is between approximately 0.1 and 1.0 milligrams or less per milliliter of the body fluid sample being handled. Generally, the fluorescein or other fluorescent chemical may be used in its known concentrations and amounts. Whereas fluorescein is detectable at two parts per million with special equipment, its visual detectability increases with increases in the concentration.

Those tests of the body fluid sample which are affected by the fluorescent chemical may be shown to be reliable upon adjustment by a standard correction factor for the applicable concentration of the known fluorescent chemical used.

Whereas fluorescein is an acceptable and well known fluorescent chemical, it is not critical to the present invention and many others may be substituted such as the following;

| | |
|---|---|
| Bromcresol Green | Dibromofluoroescein |
| Bromcresol Purple | Fluorescein |
| Bromphenol Blue | Indigo Carmine |
| Bromphenol Red | Metacresol Purple |
| Bromthymol Blue | Methyl Orange |
| Chlorophenol Red | Methyl Red |
| Congo Red | Methyl Violet |
| Cresol Red | Neutral Red |
| Phenolphthralein | Phenol Red |
| Tetra Bromofluorescein | Tetraiodofluorescein |
| Thymol Blue | Thymolthalein |
| Lalachite Green | |
| Tetrachlorotetrabromofluorescein | |

In operation, blood samples and other body fluid samples are collected in receptacles preferably already including a fluorescent chemical either in a dry or wet state although the fluorescent chemical may be added after introduction of the body fluid sample. Thereafter any spills of the body fluid sample from the receptacle during transport, storage or testing are readily detectable by illuminating those surfaces exposed to such spills with an ultraviolet light. At the end of a work day or periodically during the day, those handling the body fluid samples could simply pass a portable ultraviolet light across those surfaces of their skin, clothing, operatory or lab station which may have been exposed to spills or other accidental contact. Any spills that did occur will be readily visible as fluorescent spots. If no such spots appear, the individual can rest assured that he or she was not exposed to any possible infectious diseases.

If one or more spots do appear, the individual can immediately clean the spotted surface and again illuminate it with an ultraviolet light to test whether the cleaning effectively removed the body fluid sample. A standard precedure for cleaning such spills may be to wash the exposed surface with a bleach solution.

The invention affords a useful tool for a laboratory manager as a proficiency review for his employee technicians. By exposing their laboratory stations to an ultraviolet light, any spills which are not cleaned up will be readily visible.

Likewise, the invention will be useful for the treatment of accidental subcutaneous needle punctures by nurses and other medical personnel. The puncture should be caused to bleed by a cut or the like, drained and then illuminated under an ultraviolet light to assure that any potentially contaminated body fluids were effectively removed from the puncture.

Figure 8:
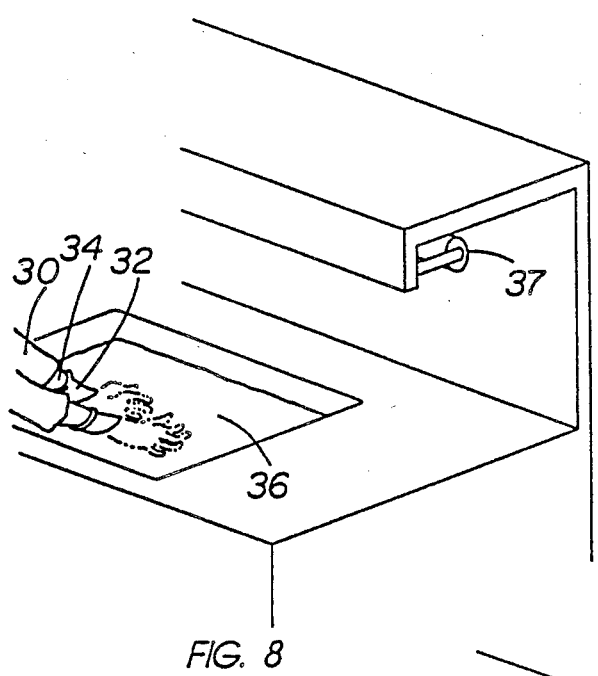
FIG. 8 is a diagrammatic illustration of an individual inserting gloved hands into a bath of fluorescent chemical.
Figure 9:
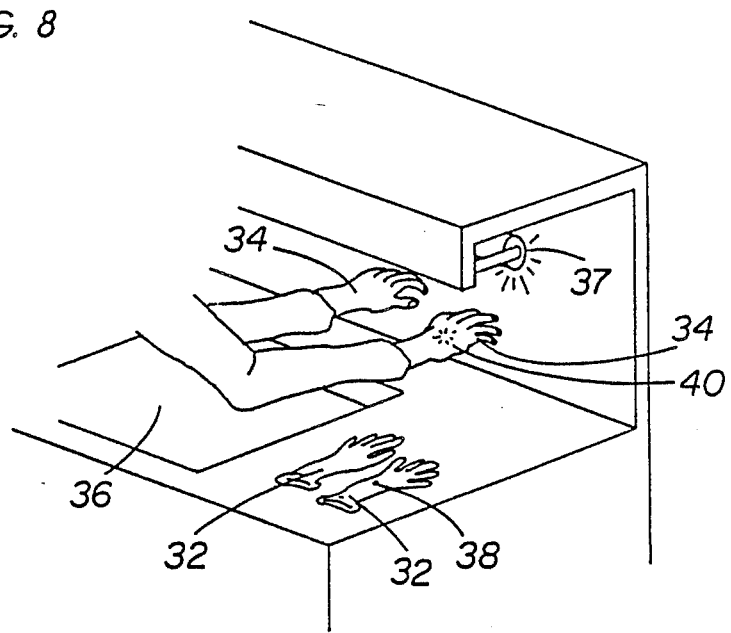
FIG. 9 is a diagrammatic illustration of an individual exposing his ungloved hands to an ultraviolet light.

Referring to FIGS. 8 and 9, there is shown a method for detecting accidental exposure to a body fluid by a skin surface protected by gloves or other substantially fluid impervious covering. A physician or other medical personnel 30 wearing protective gloves 32 on his hands 34 would submerge his gloved hands into fluorescent fluid 36, remove his gloves 32 or other covering from his hands 34 or other covered skin surface and then illuminate his hands or other skin surface with an ultraviolet light 37. If the gloves or other covering has a pinhole 38, as indicated in FIG. 9 or any other tear or opening that allows fluorescent fluid to contact the skin, a fluorescent spot 40 will be visible on the hand or skin surface under the ultraviolet light. The spot can then be cleaned and rechecked for effective cleansing. If no spots appear, the personnel can rest assured that his hands or other covered skin surface were not exposed to any potentially contaminated body fluids.

Whereas the invention has been shown and described in connection with only certain embodiments thereof, many modifications, substitutions and additions may be made which are within the intended broad sxope of the appended claims.

I claim:

1. A process for detecting accidental exposure of a protected skin surface to a body fluid, comprising,
   protecting a skin surface by covering it with a substantially fluid impervious covering thereby providing a covered skin surface,
   causing said covered skin surface to contact a body fluid,
   providing a solution of a fluorescent fluid,
   submerging said covered skin surface into said fluorescent fluid,
   removing said covered skin surface from said fluorescent fluid,
   removing said fluid impervious covering from said skin surface,
   illuminating said skin surface with a light operative to cause said florescent fluid to be visually fluorescent, and,
   visually detecting on said skin surface any fluorescent spots illuminated by said light.

2. The process of claim 1 wherein the step of protecting a skin surface comprises placing a glove over a hand.

3. The process of claim 1 wherein the step of causing said covered skin surface to contact a body fluid comprises providing medical or dental treatment for a patient.

4. The process of claim 1 wherein the step of causing said covered skin surface to contact a body fluid comprises drawing blood for subsequent analysis.

5. A process for detecting accidental contact with a body fluid sample, comprising,
   containing a body fluid sample in a receptacle,
   providing a fluorescent chemical in said receptacle,
   handling said receptacle such as for collection or testing of said body fluid sample,
   illuminating, with a light operative to cause said fluorescent chemical to be visually florescent, surfaces which were exposed to accidental contact by said body fluid sample, and,
   visually detecting any fluorescent spot illuminated by said light.

6. The process of claim 5 wherein said receptacle is selected from the group consisting of a test tube, blood bag, pyringe and blood collection needle.

7. The process of claim 5 wherein said florescent chemical was selected from the gorup consisting of fluorescent, a fluorescent derivative, bromcresol, bromphenol, bromthymol, chlorophenol, phenolphthalein, and thymolphthalein.

8. The process of claim 5 wherein said providing step comprises placement of said florescent chemical into said receptacle prior to said body fluid sample.

9. The process of claim 5 wherein said providing step comprises placement of said fluorescent chemical into said receptacle after said body fluid sample.

10. The process of claim 8 wherein said fluorescent chemical is placed in said receptacle in a wet state.

11. The process of claim 8 wherein said fluroescent chemical is placed in said receptacle in a dry state.

12. The process of claim 5 wherein said surfaces which were exposed to accidental contact are selected from the group consisting of body parts, clothing, furniture, equipment and a laboratory station.

13. The process of claim 5 wherein said illuminating step comprises exposing said surfaces to an ultraviolet light.

14. In combination,
    a receptacle adapted for the collection of whole blood or a liquid blood component, an anticoagulant in said receptacle and adapted to be mixed in solution with blood introduced into said receptacle, and
    a fluorescent chemical in said receptacle and adapted to be mixed in solution with blood introduced into said receptacle whereby spills of the blood, anticoagulant and fluorescent chemical soluiton are visually detectable upon illumination with an ultraviolet light.

15. The combination of claim 14 wherein said receptacle is selected from the group consitsting of a test tube, blood bag, syringe and blood collection needle.

16. The combination of claim 14 wherein fluorescent chemical was selected from the group consisting of fluorescein, a fluorescein derivative, bromcreseol, bromphenol, bromthymol, chlorophenol, phenolphthalein, and thymolphthalein.

* * * * *